July 3, 1945. R. S. PHILBRICK 2,379,592
PNEUMATIC CLUTCH
Filed Nov. 16, 1943 9 Sheets-Sheet 1

INVENTOR.
Robert S. Philbrick
BY Lancaster, Allwine and Rommel
ATTORNEYS.

July 3, 1945. R. S. PHILBRICK 2,379,592
PNEUMATIC CLUTCH
Filed Nov. 16, 1943 9 Sheets-Sheet 4

INVENTOR.
Robert S. Philbrick

BY
ATTORNEYS.

July 3, 1945.  R. S. PHILBRICK  2,379,592
PNEUMATIC CLUTCH
Filed Nov. 16, 1943  9 Sheets-Sheet 5

INVENTOR.
Robert S. Philbrick
BY Lancaster, Allwine and Rommel
ATTORNEYS.

July 3, 1945. R. S. PHILBRICK 2,379,592
PNEUMATIC CLUTCH
Filed Nov. 16, 1943 9 Sheets-Sheet 6

INVENTOR.
Robert S. Philbrick
BY
ATTORNEYS.

July 3, 1945.  R. S. PHILBRICK  2,379,592
PNEUMATIC CLUTCH
Filed Nov. 16, 1943  9 Sheets-Sheet 9

INVENTOR.
Robert S. Philbrick
BY
ATTORNEYS.

Patented July 3, 1945

2,379,592

UNITED STATES PATENT OFFICE 2,379,592

PNEUMATIC CLUTCH

Robert S. Philbrick, York, Pa.

Application November 16, 1943, Serial No. 510,533

13 Claims. (Cl. 192—58)

The present invention relates to motion transmitting means, and particularly to clutches of the pneumatic type adapted to transmit motion of a motor, engine or other power unit to a load moving, or other work performing mechanism.

The principal objects of the invention are to provide a pneumatic clutch operating by trapping and compressing bodies of air, or gas, until such time that the air pressure equals the torque of the force to be overcome; and to provide a clutch which will overcome starting inertia and have the necessary power range to gradually impose the load on the power unit without shock or vibration.

In a practical application of the invention, the clutch operates as a compressor, compressing air until the pressure thereof equals the torque of the force to be overcome, at which time the driving and driven units of the clutch rotate in unison. This is in part accomplished by use of gate valves against which the air is compressed, and a control means which may be selectively actuated by the operator to cause the gate valves to open thus allowing the air to flow freely without being trapped by the gate valves, and in effect disengaging the clutch. During the interval of time between that which is generally termed the "disengaged" and "engaged" conditions of the clutch, the load is being picked up, so to speak, thru a compressible and expansible medium such as air. Variations in the load are thus absorbed so that the motor or drive shaft is not directly subjected to such fluctuating loads, and the operator cannot subject the motor or prime mover to sudden load as with friction and some types of oil or liquid clutches.

Another object of the invention is to provide clutches which may be easily manufactured and which will remain in good repair for a considerable length of time especially when air, which may be taken from and exhausted into the atmosphere, is used, due to its cooling properties.

While I am aware that clutches using liquids, such as oil, as a driving medium have been proposed and used, it has been found that they are affected by temperature changes which render them very quick acting and difficult to operate when cold, or inefficient when warm or hot, if sufficient clearance is allowed for use of a viscous liquid, such as cold oil. Another object of the invention is therefore to provide clutches which use air or gas as a driving medium thus avoiding the undesirable characteristics of liquid clutches.

Other objects and advantages of the invention will appear in the following detailed description of the preferred embodiment of my invention, taken in connection with the accompanying drawings, forming a part of this specification, and in which drawings.

Figure 5:
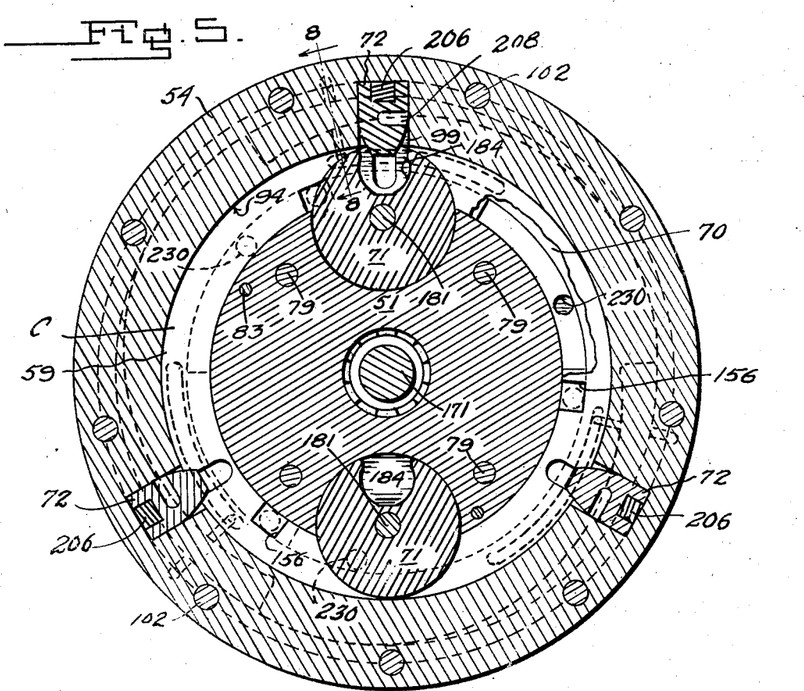
Figure 5 is a view similar to Figure 4, but looking in the direction of the arrows 5—5 on the line x—x of Figure 3, a portion of one of the elements being broken away to disclose details.

In the drawings, A designates a rotary driving unit, and B, a rotary driven unit, providing an annular airway C, the driven unit B including an air pressure chamber D; F means carried by the units A and B to alternately draw air into the way C and compress same when there is relative movement between the units A and B; G means for controlling passage of compressed air from the airway C to the compression chamber D; and, H means for controlling exit of air from the compression chamber D, and in one position, closing off communication between the airway C and compression chamber D, as shown in Figure 5.

Figure 6:
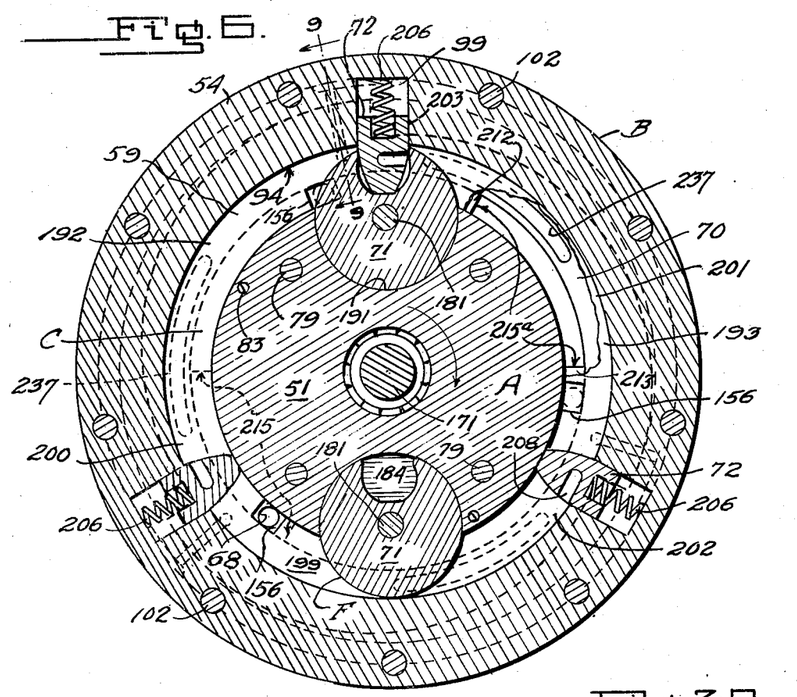
Figure 6 is a view similar to Figure 5 but showing the clutch in the so called "engaged" condition.
Figure 7:
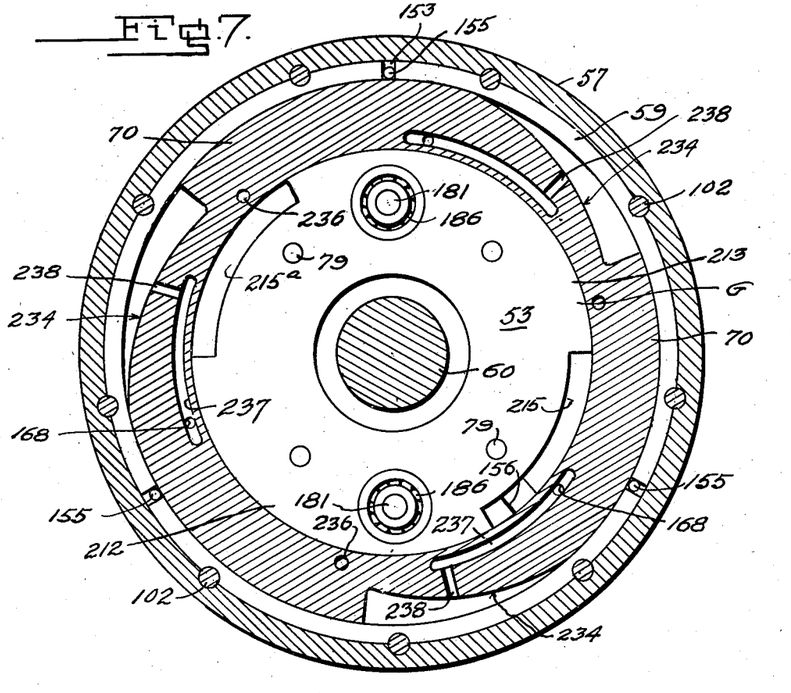
Figure 7 is a vertical cross-sectional view on the line y—y of Figure 3, looking in the direction of the arrows.

The rotary driving unit A includes, in the example shown, a drive shaft 50, a hub element or rotor body 51 and side plates 52 and 53; while the rotary driven unit B, in the example shown includes, an annular body part 54 encircling the hub element 51, a gear cover 55 surrounding a portion of the drive shaft 50, and located to one side of the body part 54, a chambered portion 57 to the other side of body part 54, ring-like guide plates 58 and 59 cooperating with and acting as tracks for the side plates 52 and 53, respectively, and a driven shaft 60. The hub element or rotor body 51 and side plates 52 and 53, of the rotary driving unit, and the annular body part 54 and guide plates 58 and 59 cooperate to provide the annular airway C in which parts of means F operate, as shown in Figure 6, to draw in air and compress same when changing from a "disengaged" to an "engaged" condition, and in which parts of means F idle when changing from an "engaged" to a "disengaged" condition, as shown in Figures 4 and 5.

Figures 17, 18, 19, 20, 21, 41, 42, 43:
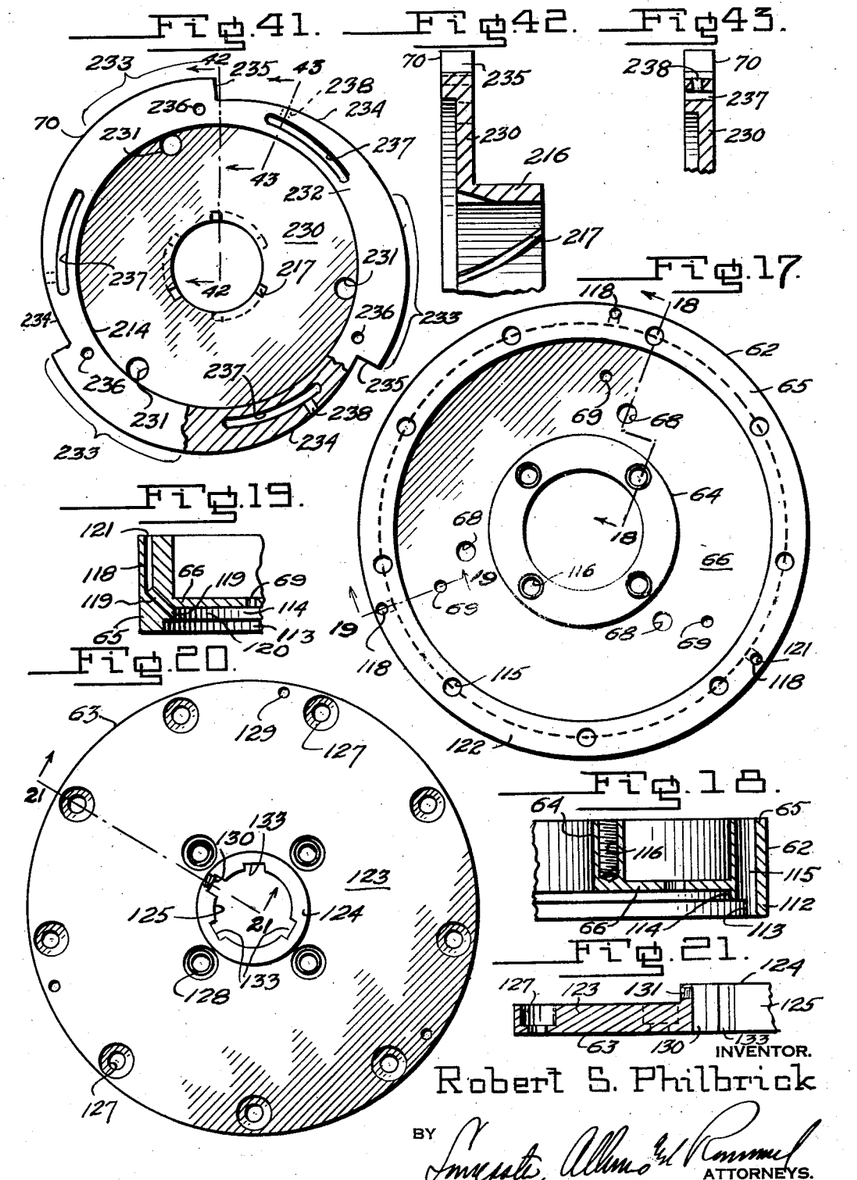
Figure 17 is an outside end elevation on a reduced scale of another part of the driven unit.
Figures 18 and 19 are sectional views on the lines 18—18 and 19—19, respectively, of Figure 17.
Figure 20 is an outside elevation on a reduced scale of a cover plate for the unit shown in Figure 17.
Figure 21 is a sectional view on the line 21—21 of Figure 20.
Figure 41 is an elevation, on a reduced scale, looking toward the inner end of an element of control means for the clutch.
Figures 42 and 43 are sectional views on the lines 42—42 and 43—43, respectively, of Figure 41.

The chambered portion 57 of the rotary driven unit B is preferably made up of a body part 62 shown more in detail in Figures 17–19, and a cover 63, shown more in detail in Figures 20 and 21, the body part 62 including an inner annular portion 64, an outer annular portion 65, and a wall 66 joining the portions 64 and 65 so as to provide with the cover 63, the annular pressure chamber D. The wall 66 is disposed nearest the major airway C and is provided with a plurality of major transverse ports 68 spaced equidistant from each other and from the axis of the clutch, and laterally of the airway C. It is thru ports 68 that air compressed in airway C finds its way to chamber D. The wall 66 is also provided with a plurality of minor transverse ports 69, also spaced equidistant from each other and from the axis of the clutch, provided for egress of air from pressure chamber D.

Figure 3:
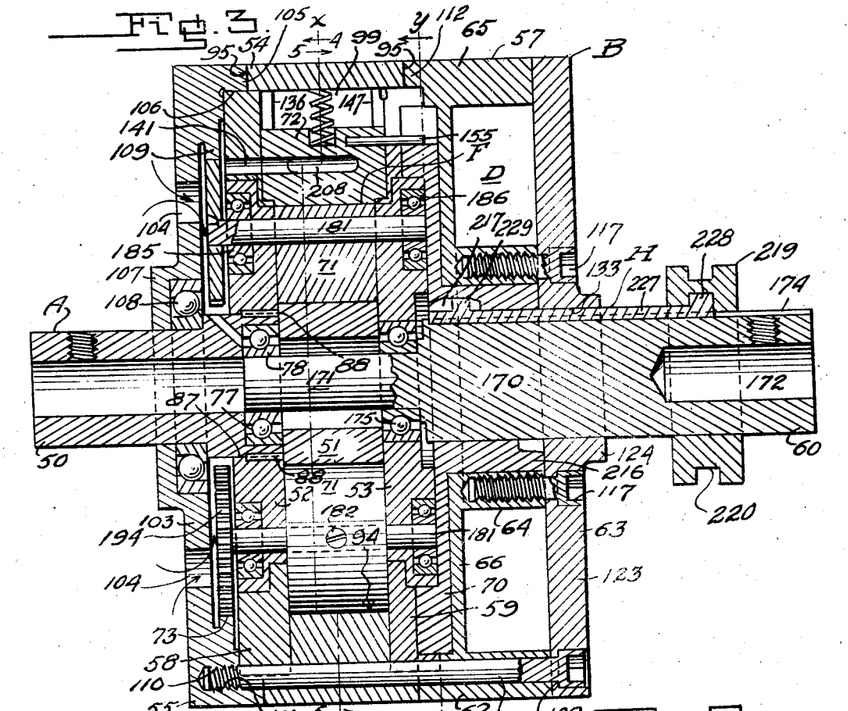
Figure 3 is a view mainly in central vertical section, longitudinally of the axis of the clutch, some parts being shown in elevation to disclose preferred details.
Figure 4:
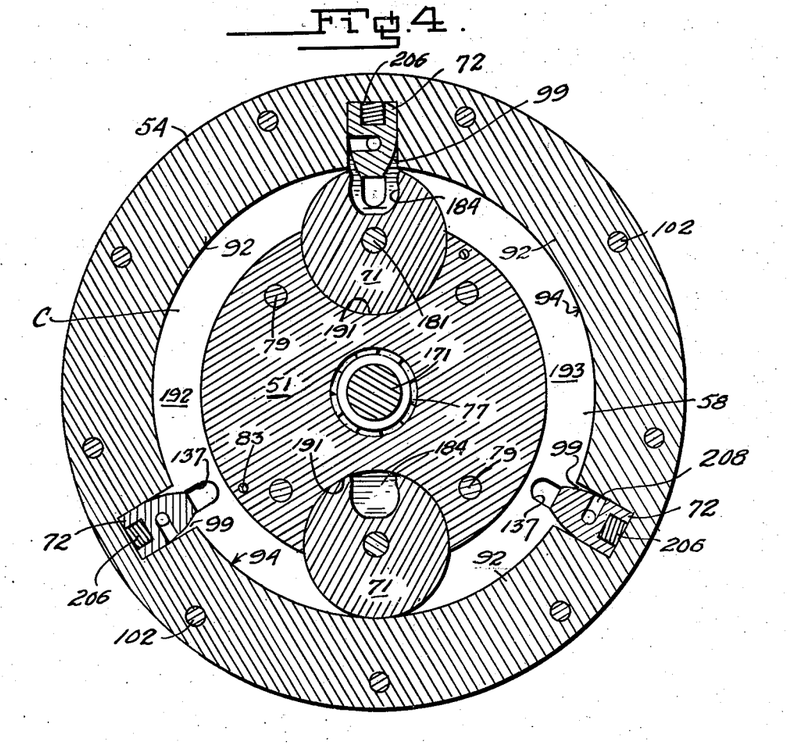
Figure 4 is a vertical cross-sectional view on the line x—x of Figure 3, looking in the direction of the arrows 4—4, but with the clutch in the so called "disengaged" condition.
Figures 31, 32, 33, 34:
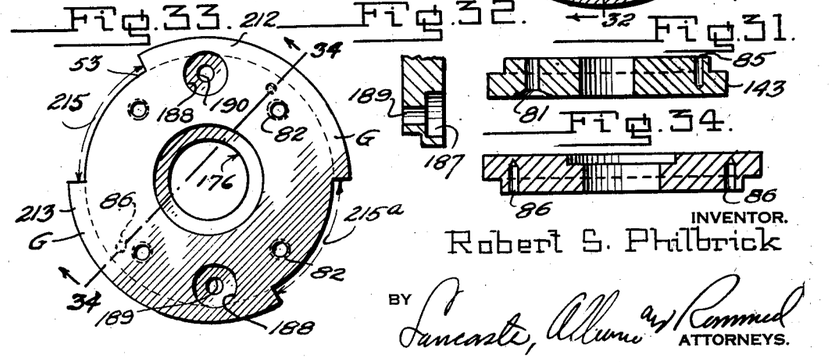
Figures 31 and 32 are sectional views on the lines 31—31 and 32—32, respectively, of Figure 30.
Figure 33 is a view similar to Figure 30 but looking toward the outside face of another side member associated with the hub element shown in Figure 28.
Figure 34 is a sectional view on the line 34—34 of Figure 33.

The wall 66 is spaced from the adjacent side plate 53 of the rotary driving unit A and from the ring-like guide plate 59 of rotary driven unit B, as shown in Figure 3, to accommodate a valve plate 70, shown more in detail in Figures 41–43, forming a part of means H. It is this valve plate 70, the means G (Figure 33) carried by side plate 53, characteristics of the guide plate 59 (Figures 24–27) and characteristics of the chambered body 57 (Figures 17–21) that control entrance of air from the airway C to the pressure chamber D; exit of air from the pressure chamber to the atmosphere; and, for service in efficient operation of the clutch.

The means F for alternately drawing air into the airway C and compressing the same, when there is relative movement between the driving and driven units A and B, comprises a plurality of rotary barriers 71, carried by the driving unit A; a plurality of gate valves 72 carried by driven unit B; and gearing 73 carried by units A and B for operating the barriers 71.

Figure 10:
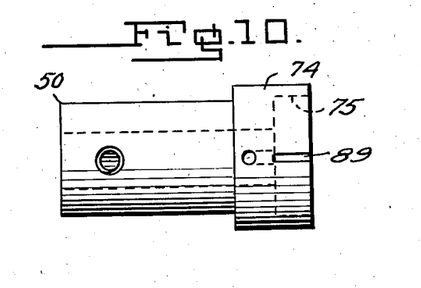
Figure 10 is a plan view of a drive shaft of the driving rotary unit.
Figure 11:
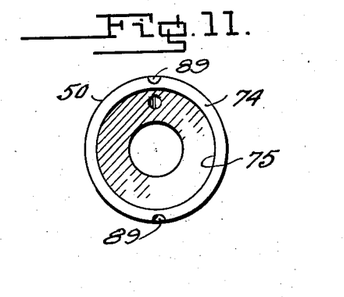
Figure 11 is an inner end elevation of the member shown in Figure 10.

Preferred characteristics of the rotary driving unit A are as follows:

The drive shaft 50 as shown in Figures 3, 10 and 11 is provided with an enlarged inner end portion 74 having a cavity 75 for receiving an anti-friction bearing 77, the inner race 78 of which assists in supporting the driven shaft 60 as hereinafter described. The hub element 51 and side plates 52 and 53 are secured together by bolts 79 extending thru holes 80 in element 51 and having its end portions accommodated in holes 81 and 82 in the side plates 52 and 53, respectively. There may also be provided dowel pins 83 extending thru holes 84 in element 51 and having their ends accommodated in recesses 85 and 86 in the side plates 52 and 53, respectively. The side plate 52 is provided with a central opening 87 to fit the end portion 74 of drive shaft 50, suitable keys 88 being accommodated in recesses 89 and 90 at the outer periphery of end portion 74, and the inner periphery of side plate 52, respectively.

Figure 15:
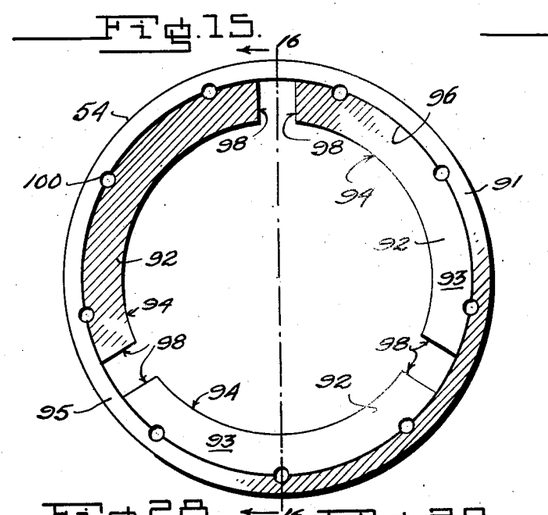
Figure 15 is an end elevation, on a reduced scale of one of the parts of the driven unit.
Figure 16:
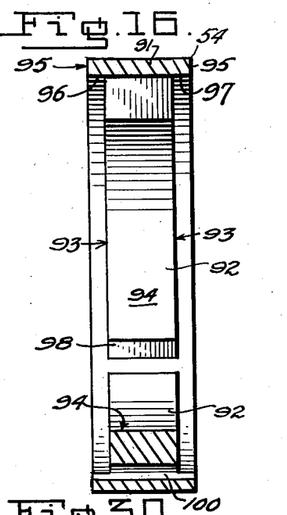
Figure 16 is a vertical sectional view on the line 16—16 of Figure 15.

Also, preferred characteristics of the rotary driven unit, are as follows:

The annular body part 54, shown more in detail in Figures 15 and 16, comprises a ring-like outer portion 91 and spaced apart, inwardly projecting, arcuate ribs 92. These ribs are rectangular in cross section, presenting flat side faces 93, and an inner track face 94 concentric with the ring-like portion 91. The ribs 92 are inset with respect to the opposite side faces 95 of the latter to provide recesses 96 and 97 for accommodation of portions of the guide plates 58 and 59, respectively. The ends 98 of ribs 92, at the spaces between the ribs, are parallel and cooperate with the guide plates 58 and 59 to provide pockets 99 to accommodate the gate valves 72. Suitable transverse holes 100 are provided to accommodate the shanks 101 of bolts 102 used to connect various parts of the rotary driven unit.

Figure 2:
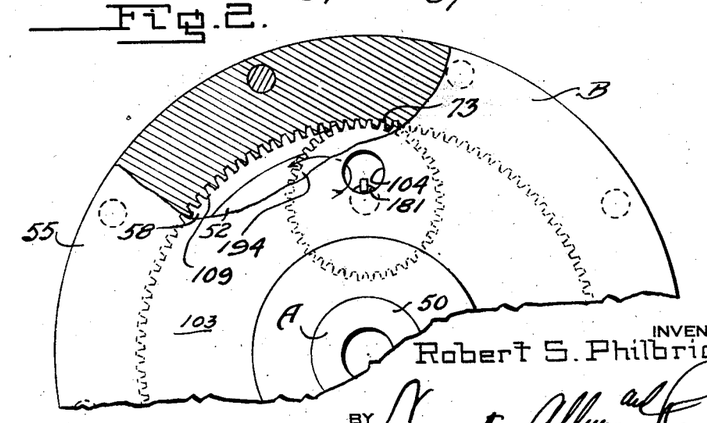
Figure 2 is a fragmentary view partly in end elevation and partly in vertical section of the clutch, showing more particularly a path which air may take entering the clutch, and gearing forming a part of means for compressing air in the clutch.

The gear cover plate 55, shown more in detail in Figures 2 and 3, comprises a disc-like body part 103, encircling a portion of drive shaft 50 and provided with a plurality of transverse air inlet holes 104; an inwardly extending annular flange on the body part 105 confronting the side face 95 of annular body part 54 and presenting a recess 106 for accommodating a part of the ring-like guide plate 58; an enlargement 107 of the body part, about the drive shaft 50, accommodating an antifriction bearing 108 which also engages the drive shaft 50; and a relatively large internal gear 109 forming a part of the gearing 73. The gear cover plate 55 is also provided with screw-threaded sockets 110 for accommodating the screw-threaded ends 111 of bolts 102.

Figure 8:
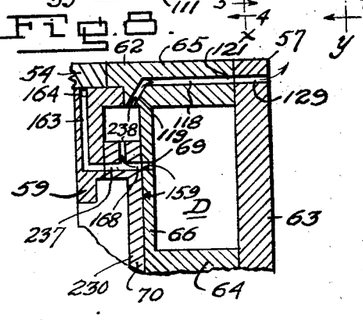
Figure 8 is a fragmentary sectional view on substantially the line 8—8 of Figure 5, looking in the direction of the arrows, to show a path air may take to exhaust the pressure chamber of the clutch and render it "disengaged."
Figure 9:
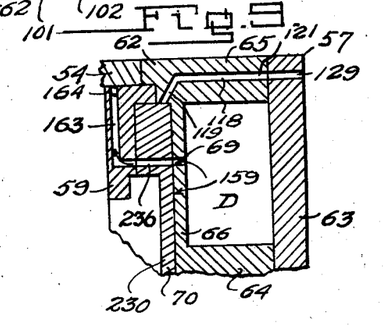
Figure 9 is a fragmentary sectional view on substantially the line 9—9 of Figure 6, looking in the direction of the arrows, to show the manner in which air in the pressure chamber may find its way to assist in rendering the clutch operative as a motion transmitting medium, and cannot find egress to the atmosphere surrounding the clutch.

The body part 62 of chambered portion 57 in addition to the characteristics above described, is provided with an annular flange 112, similar to flange 105 confronting the other side face 95 of annular body part 54 and presenting a recess 113 for accommodating the ring-like guide plate 59. Also the wall 66 is inset with respect to recess 113 to provide another smaller annular recess 114 for accommodation of a portion of the valve plate 70. The outer annular portion 65 is provided with transverse holes 115 for accommodation of the shanks 101 of bolts 102 and the inner annular portion 64 is provided with screw-threaded sockets 116 for receiving the threaded shanks of bolts 117 used to assist in securing the cover 63 to the body part 62. Another important characteristic of the body part 62 is that it is provided with a plurality of air outlet ports 118, spaced equidistant from each other and from the axis of the chambered portion 57. As shown in Figures 8, 9 and 19, these ports 118 each have an inlet end 119 open to the annular wall 120 of recess 114, and an outlet end 121 open at the face 122 that confronts cover 63.

Figure 1:
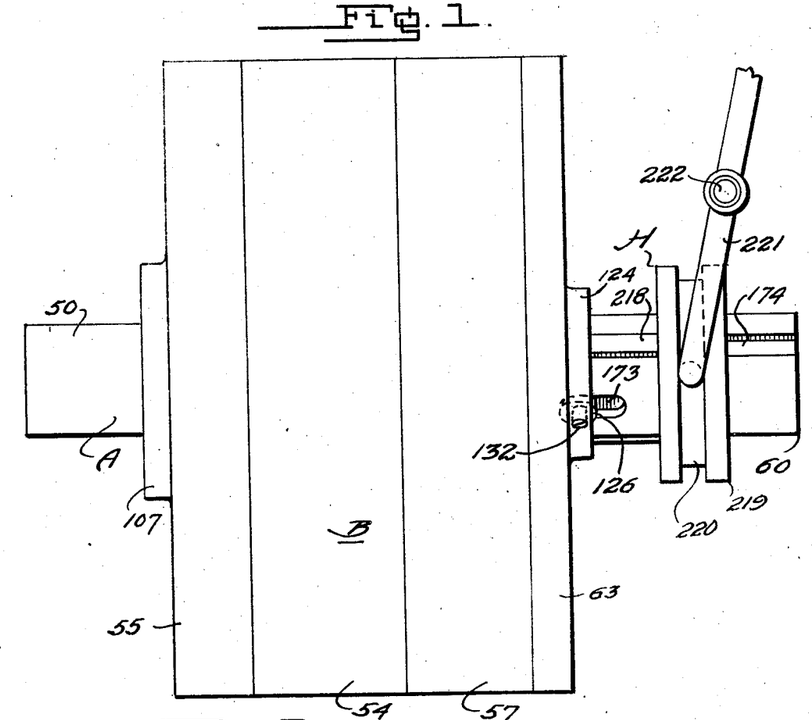
Figure 1 is a side elevation of the clutch.

The cover 63 comprises a disc-like body part 123 and a hub 124, the opening 125 of which encircles the driven shaft 60 and is keyed thereto as by key 126 shown in Figure 1. The body part 123 has, near its rim, recessed holes 127 to accommodate the shanks and heads of bolts 102; recessed holes 128 near hub 124 to accommodate the shanks and heads of bolts 117; and outlet ports 129 to align with the outlet ends 121 of ports 118. The hub 124 has a transverse keyway 130 communicating with the opening 125 to receive a portion of the key 126, there being a radial screw-threaded bore 131 in the hub to receive a set screw 132 to hold the key 126 in place. There is also provided in hub 124 a plurality of transverse slide ways 133, communicating with opening 125 for a purpose to be subsequently set forth.

Figure 22:
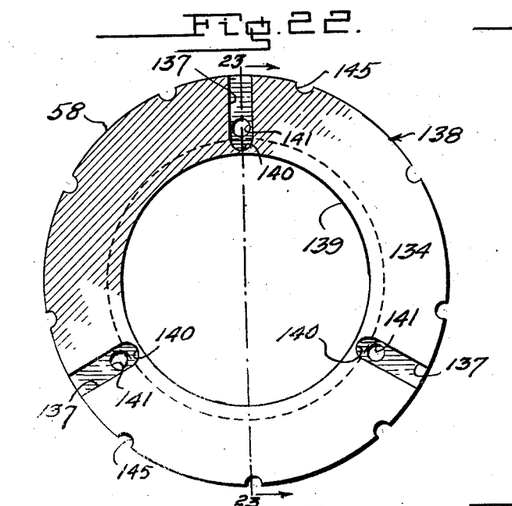
Figure 22 is a view on a reduced scale in elevation looking toward the inside face of one of the guide plates for gate valves hereinafter described.
Figure 23:
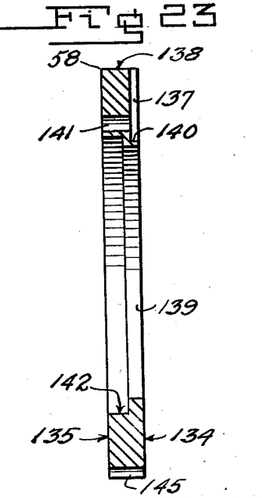
Figure 23 is a sectional view on the line 23—23 of Figure 22.

The ring-like guide plate 58, shown in detail in Figures 22 and 23, has opposite parallel side faces 134 and 135. The face 134 cooperates with the ribs 92 of annular body part 54 (Figure 15) to provide one end wall 136 for each of the pockets 99. Open to the zones of face 134 which thus serve as end walls 136 are radial grooves 137 also open to the outer periphery 138 of the plate 58 and terminating short of the inner periphery 139 of said plate to provide abutments 140. Open to each of the grooves 137, near the abutment 140 thereof, is a transverse air inlet port 141. The side of plate 58 opposite to side wall 134 has a recess 142 to accommodate the major portion 143 of side plate 52, the minor portion 144 of the plate 52 being accommodated in the opening defined by the inner periphery 139 of the plate 58. Arcuate recesses 145 are open to the outer periphery 138 to accommodate the shanks of bolts 102. It will be noted in Figure 3, that the ring-like guide plate 58 is accommodated partly in the recess 96 of annular body part 54 and partly in the recess 106 of gear cover 55 and that this ring-like guide plate 58 serves as a track for the side plate 52 of the rotary driving unit A.

Figures 24, 25, 26, 27:
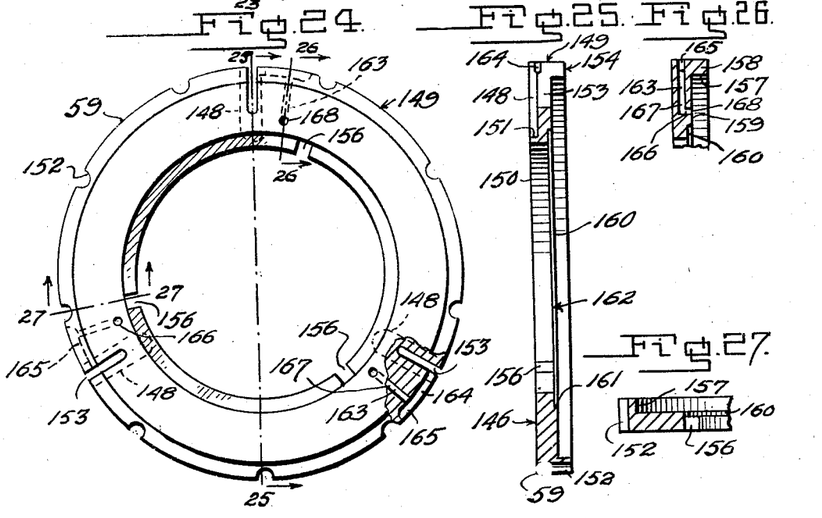
Figure 24 is a view similar to Figure 22 but looking toward the outside face of another guide plate for gate valves, a portion of the view being broken away and shown in vertical section to disclose details.
Figures 25, 26 and 27, are sectional views on the lines 25—25, 26—26 and 27—27, respectively, of Figure 24.
Figure 28:
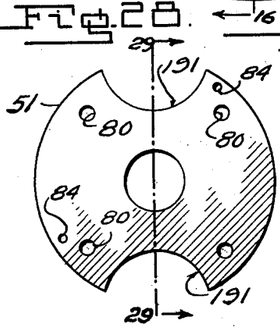
Figure 28 is an end elevation, on a reduced scale, of a hub element forming a part of the rotary driving unit.
Figures 29, 30:
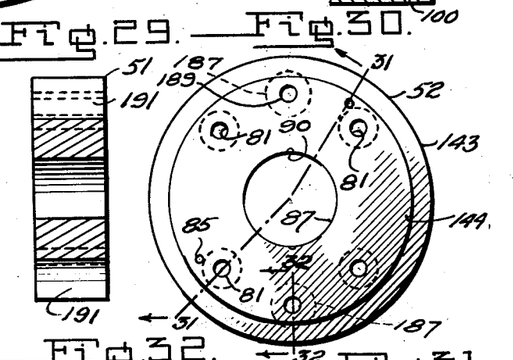
Figure 29 is a sectional view on the line 29—29 of Figure 28.
Figure 30 is a view in end elevation, on a reduced scale, looking toward the inside of one of the side members associated with the hub element shown in Figure 28.

The ring-like guide plate 59, shown more in detail in Figures 24–27 is somewhat similar to its companion plate 58 in that its one face 146 cooperates with ribs 92 to provide the other end wall 147 for each of the pockets 99; there are, open to the zones of face 146, radial grooves 148 also open to the outer periphery 149 of plate 59 which terminate short of the inner periphery 150 to provide abutments 151. Arcuate recesses 152 open to the outer periphery are also provided to accommodate the shanks of bolts 102. The side plate 53 of the rotary driving unit is partly accommodated in the opening defined by the inner periphery 150, as shown in Figure 3. However, the ring-like guide plate 59 is so made as to assist in controlling entrance of air to the pressure chamber D, exit of air therefrom to the pockets 99 and to the atmosphere, and to accommodate characteristics of means H. Open to each of the grooves 148 is a radial slot 153 also open to the other face 154 of the plate 59. Each slot serves to accommodate a pin 155 associated with the adjacent gate valve 72 and the valve plate 70, as shown in Figure 3. Another characteristic of the ring-like plate 59 is that it has a number of transverse ports 156 at its inner portion at all times axially aligned with the major ports 68 in the wall 66 of body part 62 as shown in Figure 6 where in the lower left side of the view one of the ports 156 is shown open to a port 68. A further characteristic of plate 59 is that it has a major recess 157 defined by a peripheral flange 158 and a face 159 for accommodating a portion of the valve plate 70, and a minor recess 160 inwardly of the plane of face 159 and defined by circular wall 161 and face 162 for accommodating the control means G. Still another characteristic of plate 59 is that it has ports 163, corresponding in number to the number of minor ports 69 in body part 62, for delivering air under pressure to each of the pockets 99, to act upon the gate valve 72 therein when the clutch is operating to transmit motion from the driving shaft to the driven shaft. The entrance ends 168 of ports 163 are axially aligned with the minor ports 69 and are open at the face 159 as shown in Figures 8, 9 and 26, and the outlet ends 164 are open to the radial grooves 148 and slots 153. Merely by way of example, to facilitate manufacture the outlet portions 164 of the ports 163 may be made by milling arcuate grooves 165 in the pheripheral face 149 open to the grooves 148 and slots 153, drilling holes 166 partially thru the plate from the face 159 to provide the entrance portions of the ports 163 and connecting grooves 165 and holes 166 by holes 167 drilled radially of the plate as shown in Figures 24 and 26.

Figures 12, 13:
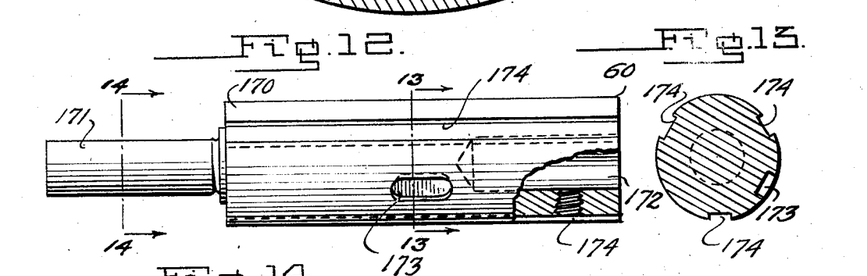
Figure 12 is a view partly in elevation and partly in vertical section thru a driven shaft of the driven rotary unit.
Figures 13 and 14 are cross-sectional views on the lines 13—13 and 14—14 of Figure 12, respectively.
Figure 14:
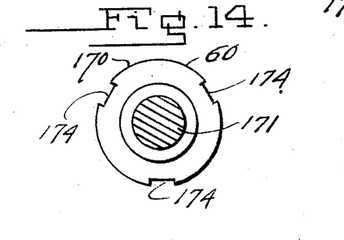

The driven shaft 60 shown more in detail in Figures 12–14, comprises a main shaft portion 170 and a reduced stub shaft portion 171. The portion 170 is shown provided with a socket 172 for receiving any part, not shown in the drawings, to be driven thereby. It also has a recess 173 for the key 126 whereby the cover 63 is keyed to the driven shaft, and a plurality of longitudinally extending grooves 174 open to its external periphery to accommodate parts of the control means G. The stub shaft portion, at its free end, receives the inner race 78 of anti-friction bearing 77. Another anti-friction bearing 175 is also interposed between the stub shaft portion adjacent its juncture with the main shaft portion 170, and the inner periphery 176 of side plate 53. The bearings 77 and 175 serve to rotatably support the rotary driving unit A on the driven shaft when the clutch is in a "disengaged" condition.

Figures 35, 36, 37, 38, 39, 40:
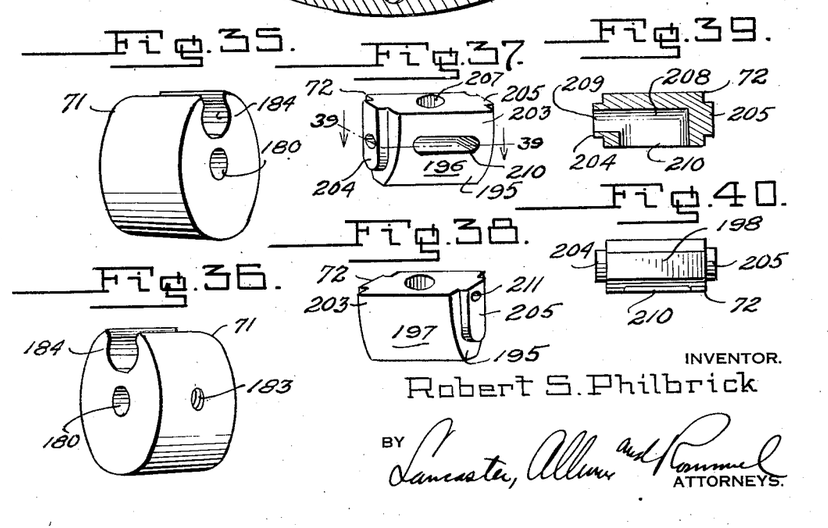
Figures 35 and 36 are perspective views looking at different sides and ends of a rotary barrier element associated with the rotary driving unit of the clutch.
Figures 37 and 38 are perspective views looking at different sides and ends of a gate valve associated with the rotary driven unit of the clutch.
Figure 39 is a sectional view on the line 39—39 of Figure 37.
Figure 40 is a bottom plan view of the gate valve.

Referring now to the means F for alternately drawing air from the atmosphere into the way C and compressing same, as previously set forth it includes the rotary barriers 71, the gate valves 72 and gearing 73. An example of the rotary barrier 71 is shown in perspective in Figures 35 and 36, and in cross section in Figures 4, 5 and 6. It is in the nature of a cylinder having an axial bore 180 for receiving its supporting shaft 181, to which it may be secured by a set screw 182, received in a radial screw-threaded bore 183, or in any suitable manner; and a pocket 184 shaped somewhat like the space between the teeth of an ordinary gear wheel. The ends of shaft 181 may be supported by the inner races of anti-friction bearings 185 and 186, the outer races of which are received in recesses 187 and 188 of the side plates 52 and 53, respectively, there being holes 189 and 190 in the said plates thru which the end portions of the shaft extend. In order to accommodate the rotary barriers 71 in the hub element or rotor body 51, with which they are carried, the latter is provided with substantially semi-circular recesses 191, in the examples shown, diametrically opposite one another, to accommodate two of such barriers. These barriers are in substantially fluid tight engagement with their respective recesses, with the side plates 52 and 53, and with the guide plates 58 and 59. They are also arranged to have substantially fluid tight engagement with the track face 74 of the annular body part 54 whereby they divide the airway C into chambers 192 and 193 as shown more particularly in Figure 4.

The gearing 73 is provided as positive motion transmitting means to cause the barriers 71 to rotate with respect to the hub whenever there is relative movement between the driving unit and the driven unit. This gearing includes the internal gear 109 and pinions 194, meshing therewith, there being one pinion on each shaft 181, located between the gear cover 55, the side plate 52 and the guide plate 58, as shown in Figures 2 and 3. The pitch diameters of the gear 109 and pinions 194 is such that if the rotary driven unit B is inert, its internal gear 109 will cause one complete revolution of each rotary barrier 71 with respect to the rotor body 51 for each gate valve 72 in the assembly, during one complete revolution of the rotor body 51. In the example shown there are two rotary barriers 71 and three gate valves 72, so that under the conditions mentioned, each rotary barrier will make three complete revolutions with respect to the rotor body 51, for each revolution of the latter.

As to the gate valves 72, each is formed to include a tooth-like body portion 195 having opposite side faces 196 and 197 for engagement with the walls of pockets 184 in the rotary barrier 71, and a root face 198 for engagement with the circumferential face of the rotary body 51, when this tooth-like body portion is not in a pocket of a rotary barrier 71, but functions to divide the chamber 192 into subchambers 199 and 200, and the chamber 193 into subchambers 201 and 202, as shown in Figure 6. Each gate valve also includes a piston-like portion 203, slidable in pocket 99 and end guide ribs 204 and 205 slidable in the grooves 137 and 148 of guide plates 58 and 59, respectively. Since centrifugal force will tend to throw the gate valves to an unseated position as the rotary driven unit B gains speed, I prefer to provide at least one expansion spring 206 for each gate valve, located in pocket 99 therefor, having its one end abutting against the ring-like outer portion 91 of annular body part 54 and its other end portion accommodated in a recess 207 in the piston-like portion 203. Each spring 206 has just sufficient strength to slightly overbalance the weight of its respective gate valve, so as to normally cause the valve to seat when there is no air above atmospheric pressure in the pocket, acting upon the piston-like portion 203 of the valve and the rotary driven unit B is either inert or rotating at a low speed.

Each gate valve has an air inlet port 208, the entrance end 209 of which is open at rib 204 and the outlet end 210 open at side face 196. The entrance end 209 is so located that, when the gate valve is seated, it is open to the adjacent port 141 in the guide plate 58, as shown in Figure 3, thus enabling air to be taken into the subchamber of the airway C as the adjacent rotary barrier 71 moves away from the gate valve (see subchamber 202, Figure 6). The other rib 205 is conveniently provided with a recess 211 near its upper end for accommodation of the pin 155 as shown in Figure 3. It is obvious from this description that if there is atmospheric pressure in the pockets 99 and the rotary driven unit B is rotating at a high speed, centrifugal force will throw the gate valves to open positions as shown in Figures 4 and 5, thus leaving nothing in the airway C to divide the chambers 192 and 193 into subchambers and the clutch is then in a so called "disengaged" condition. In fact if an outward force is exerted upon the pin 155 of each gate valve they will be moved to open positions, without depending on centrifugal force.

On the other hand if there is no mechanical means acting upon the pins 155 to retain the gate valves open, and there is atmospheric pressure in the pockets 99, with the rotary driven unit inert, the gate valves will assume a closed position, due to the expansion springs 206. This will result in subchambers being formed in the airway C. If the driving unit is then rotated, air will be drawn into the airway C and compressed, and the function of the means G is to control passage of the air from the airway C to the compression chamber D. In the example shown, it comprises two arcuate, flange-like valve segments 212 and 213, formed integral with the side plate 53 of the rotary driving unit A, and accommodated partly in the minor recess 160 in the guide plate 59, and partly in the recess 214 in the valve plate 70. The valve segments 212 and 213 are spaced apart to provide gaps 215 and 215ᵃ, and the segments are of such length as to permit only one port 156 (or the partial area of two of such ports 156 equal to the total area of any one of the ports 156), to be open to the pressure chamber D at any one time, and then only if the valve plate 70 permits of such, as hereinafter described.

For instance in Figure 6, assuming that the rotary driving unit A is moving in the direction indicated by the arrow, and the rotary driven unit B is rotating at a slower speed, the port 156 open to subchamber 199 in also open to a port 68 in the wall of the pressure chamber because the gap 215 between the valve segments 212 and 213, permits this, and therefore air compressed between the barrier 71 and gate valve, may find its way to the pressure chamber D. However the port 156, open to subchamber 200 is closed from communication with the pressure chamber D, by valve segment 212. Also the port 156 in subchamber 201 is likewise closed by valve segment 213. In Figure 6 we therefore find subchamber 199, delivering air under pressure to the chamber D; subchamber 200 at atmospheric pressure; subchamber 201 with air very slightly under compression; and, subchamber 202 at atmospheric pressure, or nearly so, since air is being sucked into it as by the barrier 71 moving away from the trailing gate valve 72. If, however, the pressure in chamber D has equaled the torque of the force to be overcome, the rotary driven unit B will rotate in unison with unit A and subchamber 202 will not take in any more air from the atmosphere until the load becomes greater whereupon there will again be relative movement between the units A and B, until the pressure in chamber D has again equaled the torque of the force to be overcome. If the load becomes lighter, the compression subchamber 199 will become enlarged and air will be forced from the subchambers 200 and 202.

Figure 44:
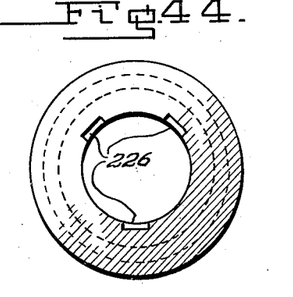
Figure 44 is an end view of a shifting element forming a part of the control means.
Figure 45:
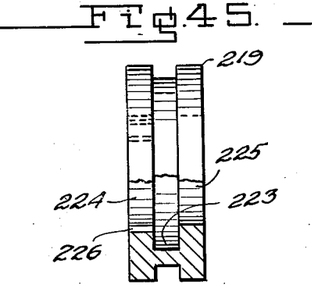
Figure 45 is a side elevation of the shifting element, a part being broken away and shown in section.

Finally in connection with the means H, in addition to the valve plate 70 which in the example shown includes a hub 216 rotatable in the inner annular portion 64 of body part 62, and has on its internal periphery spiral grooves 217 corresponding in number to the number of grooves 174 in shaft 60; a deflection key 218 for each of the companion grooves 174 and 217, a shifting collar 219 slidable longitudinally on driven shaft 60, and having a peripheral groove 220, and a clutch yoke 221 pivoted as at 222, and operating in the usual way to move the collar longitudinally of the driven shaft while the collar rotates therewith. The collar 219 has an internal circumferential groove 223 providing internal circumferential flanges 224 and 225, the former of which has three notches 226, as shown in Figure 44, to align with the grooves 174 in driven shaft 60, and the flange 225 is devoid of such notches. The flanges 224 and 225 engage the shaft 60 and retain the collar 219 concentric therewith.

Figure 46:
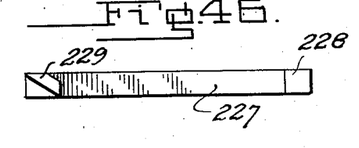
Figure 46 is a plan view of one of the shifting elements.

The deflecting keys 218, each have a body portion 227, rectangular in cross section, a shifting lug 228 extending from one longitudinal face of the body portion 227 at one end thereof, and a spiraliform lug 229 extending from the same face as lug 228 but at the opposite end of the body portion 227, as shown in Figs. 3 and 46. The body portions 227 of the deflecting keys 218 are accommodated partly in the grooves 174 of the driven shaft, partly in the slide ways 133 of cover 63, and partly in the notches 226 in collar 219. The shifting lugs 228 are received in groove 223 of collar 219 and abut against flange 225. The spiraliform lugs 229 fit in the spiral grooves 217 of hub 216. It is thus apparent that even tho the driven shaft 60 is rotating the valve plate 70 may be moved circumferentially according to the pitch of the spiral grooves 217 in its hub by moving the spiraliform lugs longitudinally of the driven shaft thru shifting yoke 221, collar 219, and deflecting keys 218.

Other characteristics of the valve plate 70 are shown in Figures 41–43. The main body 230 has thru ports 231 open to the recess 214. These ports 231 are spaced apart from each other and from the axial center of the valve plate exactly like the ports 68 in the wall 66 of body part 62. Therefore if the valve plate is in a position for rendering the clutch operative as a motion transmitting medium, these ports 68 and 231, as well as the ports 156 are all axially aligned. However passage of air thru them is controlled by the means G. The body 230 has a rim 232 which includes concentric portions 233, separated by cam portions 234, which start at shoulders 235 and gradually curve outwardly to constitute cam throws merging into the concentric portions 233. It is on these cam portions that the pins 155 ride, so as to positively unseat the gate valves 72. The rim 232 has ports 236 spaced apart from each other and from the axial center of the valve plate, the same as the inlet ends 168 of ports 163 and with the minor ports 69 in body 62, whereby air from pressure chamber D may get thru ports 69, 236 and 163 to the pockets 99 as shown in Figure 9 and thereby hold the gate valves 72 closed. This is of course the relationship of those ports when the clutch is operating as a motion transmitting medium. At that time port 118 to the atmosphere is closed by a concentric portion 233 of valve plate 70, as shown in Figures 6 and 9. The rim 232 also has elongated, arcuate thru ports 237 struck at the same radius from the axis of the valve plate, and radial ports 238 open to ports 237 and cam surfaces 234, as shown in Figure 41. The elongated arcuate ports 237 are so located as to open to the ports 69 in body 62, when the valve plate has been shifted to release the clutch, as shown in Figure 8, whereby air in pressure chamber D may reach the atmosphere and air in the valve gate pockets 99 is released thru ports 118 and 129.

It is believed the operation of the pneumatic clutch may well be understood from the foregoing, but briefly it may be stated that air is taken in thru ports 104 (Figures 2 and 3) when the rotary driving unit A is picking up the load, the air circulating around the gearing 73 and entering airway C thru ports 141 and 208, the latter being in the gate valves 72. The air is alternately taken in and compressed by the rotary barriers 71 cooperating with the gate valves 72 and is accumulated in pressure chamber D by successive opening and closing of the ports 156, 231 and 68 as thru the means G.

While the gate valves 72 are initially held closed by springs 206, when the clutch is set into operation, they are maintained closed against centrifugal action as the driven unit B gains speed, by some of the air under pressure finding its way thru the ports shown in Figure 9 to the pockets 99 where it acts upon the piston-like portions 203 of the gate valves.

When it is desired to release the clutch, the yoke 221 is operated to shift the valve plate from the position shown partly by full and partly by dotted lines in Figure 6, to the position similarly shown in Figure 5. The first effect during this shifting of the valve plate is to cut off communication between the pressure chamber D and the pockets 99 as by ports 236 in the valve plate moving out of alignment with ports 69 in the wall of the pressure chamber. Upon further movement of the valve plate, the ports 231 in the valve plate 70 are moved out of alignment with ports 156 in the guide plate 59 and ports 68 in the wall 66 of the pressure chamber. Directly as this occurs, the concentric portions 233 of the rim 232 of valve plate 70 uncovers exit ports 118 and 129 (Figure 8) and air under pressure in pockets 99 is released allowing the gate valves to open due to centrifugal force. This then frees the airway C of subchambers, and the rotary barriers cease to operate as compressor elements and merely idle in the airway C. Further movement of the valve plate 70 results in the ports 68 opening with arcuate ports 237 in the valve plate, and air in the compression chamber is released to the atmosphere as shown in Figure 8 thru ports 237, 238, 118 and 129. Finally the valve plate 70 may be moved to a position where the throw sides of cam surfaces 234 will, by engagement of the pins 155, on the gate valves, therewith, positively move the gate valves to an open position should they become stuck, and will positively hold the gate valves in an open position when the clutch is in a "disconnected" condition.

To start the clutch as a motion transmitting medium, the shifting yoke 221 is moved to shift the valve plate in a direction to release the gate valves, so they will close responsive to springs 206, and so that air may get from the airway C to the pressure chamber D where it is built up, having no egress to the atmosphere.

While in the specification reference is made to air as a motion transmitting medium, it is of course understood that any suitable gas or vapor may be used, without departing from the spirit of the invention. Also while unit A is designated a driving unit and B a driven unit, it is to be understood that instead, motion may be imparted to the unit B by the prime mover or motor and the unit A receive motion from unit B, without departing from the spirit of the invention altho it is preferred that the unit B remain inert when the clutch as a whole is not acting as a motion transmitting means.

I claim:

1. In a pneumatic clutch, the combination of a rotary driving unit and a rotary driven unit providing an annular airway; means carried by said units to alternately draw air into said way and compress same when there is relative movement between said units, said driven unit including an air pressure chamber, one wall of which is provided with a port for transfer of the compressed air to said pressure chamber; and said driving unit including a valve portion rotatable therewith, cooperating with said wall to close said port when air is being drawn into said airway and to open said port when air is being compressed in said airway, whereby the units will rotate in unison when the air pressure in said chamber equals the torque of the force to overcome in the operation of the clutch.

2. In a pneumatic clutch, the combination of a rotary driving unit and a rotary driven unit providing an annular way; means carried by said units to alternately draw air into said way and compress same when there is relative movement between said units, said driven unit including an air pressure chamber, one wall of which is provided with a port for transfer of the compressed air to said pressure chamber, and said driving unit including a valve portion rotatable therewith, cooperating with said wall to close said port when air is being drawn into said airway and to open said port when air is being compressed in said airway, whereby the units will rotate in unison when the air pressure in said chamber equals the torque of the force to be overcome in the operation of the clutch; and means to open said pressure chamber to the atmosphere to render the driven unit inert.

3. In a pneumatic clutch, the combination of a driving unit provided with a circumferential airway open to its periphery; a driven unit providing a circumferential outer wall for said airway; rotary barriers in spaced relation, carried by said driving unit, disposed in said airway, and cooperating with said driven unit to divide said airway into chambers; and tooth-like gate valves carried by said driven unit, movable radially toward and away from the bottom of said airway, each provided with a root face for engagement with the bottom of said airway said rotary barriers provided with recesses to accommodate said gate valves when there is relative movement between said driving and driven units, and said gate valves, when projected into said airway between said barriers and disposed with their root faces engaging the bottom of said airway, serving to divide said chambers into alternately changing suction and compression sub-chambers.

4. In a pneumatic clutch, the combination of a driving unit provided with a circumferential airway open to its periphery; a driven unit providing an outer circumferential wall for said airway, and including an air pressure chamber; rotary barriers in spaced relation, carried by said driving unit, disposed in said airway, and cooperating with said driven unit to divide said airway into chambers; gate valves carried by said driven unit, movable into and out of said airway, said rotary barriers provided with recesses to accommodate said gate valves when there is relative movement between said driving and driven units, and said gate valves when moved into said airway between said barriers serving to divide said chambers into alternately changing suction and compression sub-chambers; and valve means operative upon relative movement between said driving and driven units to permit air to flow from the compression sub-chambers to the air pressure chamber and to cut off communication between the suction sub-chambers and said air pressure chamber.

5. In a pneumatic clutch, the combination of a driving unit provided with a circumferential airway open to its periphery; a driven unit providing an outer circumferential wall for said airway, and including an air pressure chamber; rotary barriers in spaced relation, carried by said driving unit, disposed in said airway, and cooperating with said driven unit to divide said airway into chambers; gate valves carried by said driven unit, movable into and out of said airway, said rotary barriers provided with recesses to accommodate said gate valves when there is relative movement between said driving and driven units, and said gate valves when moved into said airway between said barriers serving to divide said chambers into alternately changing suction and compression sub-chambers; valve means operative upon relative movement between said driving and driven units to permit air to flow from the compression sub-chambers to the air pressure chamber and to cut off communication between the suction sub-chambers and said air pressure chamber; and, second valve means to cut off communication between said chambers and said air pressure chamber and open the latter to the atmosphere.

6. In a pneumatic clutch, the combination of a driving unit provided with a circumferential airway open to its periphery; a driven unit providing an outer circumferential wall for said airway, and including an air pressure chamber; rotary barriers in spaced relation, carried by said driving unit, disposed in said airway, and cooperating with said driven unit to divide said airway into chambers; gate valves carried by said driven unit, movable into and out of said airway, said rotary barriers provided with recesses to accommodate said gate valves when there is relative movement between said driving and driven units, and said gate valves when moved into said airway between said barriers serving to divide said chambers into alternately changing suction and compression sub-chambers; valve means operative upon relative movement between said driving and driven units to permit air to flow from the compression sub-chambers to the air pressure chamber and to cut off communication between the suction sub-chambers and said air pressure chamber; and second valve means, in one position to permit air under pressure from said air pressure chamber to act upon said gate valves to hold them into said airway, and in a second position to release air in said air pressure chamber to the atmosphere.

7. In a pneumatic clutch, the combination of a driving unit provided with a circumferential airway open to its periphery; a driven unit providing an outer circumferential wall for said airway, and including an air pressure chamber; rotary barriers in spaced relation, carried by said driving unit, disposed in said airway, and cooperating with said driven unit to divide said airway into chambers; gate valves carried by said driven unit, movable into and out of said airway, said rotary barriers provided with recesses to accommodate said gate valves when there is relative movement between said driving and driven units, and said gate valves when moved into said airway between said barriers serving to divide said chambers into alternately changing suction and compression sub-chambers; valve means operative upon relative movement between said driving and driven units to permit air to flow from the compression sub-chambers to the air pressure chamber and to cut off communication between the suction sub-chambers and said air pressure chamber; and second valve means, in one position to permit air under pressure from said air pressure chamber to act upon said gate valves to hold them into said airway, and in a second position to release air in said air pressure chamber to the atmosphere, and cut off communication between said chambers and said air pressure chamber.

8. In a pneumatic clutch, the combination of a driving unit providing a circumferential airway open to its periphery; a driven unit providing a circumferential outer wall for said airway and including an air pressure chamber; barriers carried by said driving unit in spaced relation, disposed in said airway and cooperating with said driven unit to divide said airway into chambers; gate valves slidable in cavities in said driven unit, movable radially into and out of engagement with the bottom of said airway, and when projected into said airway between said barriers, serving to divide said chambers into alternately changing suction and compression sub-chambers upon relative movement between the driving and driven units; valve means operative upon relative movement between said driving and driven units to permit air flow from the compression sub-chambers to said air pressure chamber, and to cut off communication between the suction sub-chambers and said air pressure chamber whereby movement of the driving unit is imparted to the driven unit as air pressure is built up in said pressure chamber; spring means in said cavities of the driven unit, acting upon said gate valves to initially overcome movement thereof due to centrifugal force as the driven unit is rotated at low speed; and second valve means to admit air from said pressure chamber to said gate valve cavities of the driven unit to overcome movement of said gate valves radially, due to centrifugal force when the driven unit is operating at a high speed.

9. In a pneumatic clutch, the combination of a driving unit providing a circumferential airway open to its periphery; a driven unit providing a circumferential outer wall for said airway and including an air pressure chamber; barriers carried by said driving unit in spaced relation, disposed in said airway and cooperating with said driven unit to divide said airway into chambers; gate valves slidable in cavities in said driven unit, movable radially into and out of engagement with the bottom of said airway, and when projected into said airway between said barriers, serving to divide said chambers into alternately changing suction and compression sub-chambers upon relative movement between the driving and driven units; valve means operative upon relative movement between said driving and driven units to permit air to flow from the compression sub-chambers to said air pressure chamber, and to cut off communication between the suction sub-chambers and said air pressure chamber when movement of the driving unit is imparted to the driven unit as air pressure is built up in said pressure chamber; spring means in said cavities of the driven unit, acting upon said gate valves to initially overcome movement thereof due to centrifugal force as the driven unit is rotated at low speed; and second valve means, in one position adapted to admit air from said pressure chamber to said gate valve cavities of the driven unit to overcome movement of said gate valves radially, due to centrifugal force when the driven unit is operating at high speed, and in another position to open said cavities and said air pressure chamber to the atmosphere.

10. In a pneumatic clutch, the combination of a driving unit providing a circumferential airway open to its periphery; a driven unit providing a circumferential outer wall for said airway and including an air pressure chamber; barriers carried by said driving unit in spaced relation, disposed in said airway and cooperating with said driven unit to divide said airway into chambers; gate valves slidable in cavities in said driven unit, movable radially into and out of engagement with the bottom of said airway, and when projected into said airway between said barriers, serving to divide said chambers into alternately changing suction and compression sub-chambers upon relative movement between the driving and driven units; valve means operative upon relative movement between said driving and driven units to permit air to flow from the compression sub-chambers to said air pressure chamber, and to cut off communication between the suction sub-chambers and said air pressure chamber whereby movement of the driving unit is imparted to the driven unit as air pressure is built up in said pressure chamber; spring means in said cavities of the driven unit, acting upon said gate valves to initially overcome movement thereof due to centrifugal force as the driven unit is rotated at low speed; and manually operable mechanism including valve means, in one position adapted to admit air from said pressure chamber to said gate valve cavities of the driven unit to overcome movement of said gate valves radially, due to centrifugal force when the driven unit is operating at high speed, and in another position to open said cavities and said pressure chamber to the atmosphere, and also including means to positively move said gate valves outwardly, out of engagement with the bottom of said airway, during movement from said first mentioned position to said second mentioned position.

11. A pneumatic clutch comprising a cylindrical driving unit provided with a circumferential airway open to its periphery; a driven unit empracing said driving unit, forming a circumferential outer wall for said airway, and provided with a pressure chamber; rotary barriers, in spaced apart relation, carried by said driving unit, disposed in said airway and cooperating with said driven unit to divide said airway into chambers; gate valves carried by said driven unit, movable radially into and out of engagement with the bottom of said airway, said rotary barriers provided with recesses to accommodate said gate valves when there is relative movement between said driving and driven units, and said gate valves, when projected into said airway between said barriers, serving to divide said chambers into alternately changing suction and compression sub-chambers; a first means normally urging said gate valves inwardly into engagement with the bottom of said airway; and a second means for selectively moving said gate valves outwardly from engagement with the bottom of said airway, said driven unit and gate valves provided with ports in communication for delivering air to said sub-chambers when acting as suction chambers during relative circumferential movement between said driving and driven units and when the gate valves are in an inward position, said driving and driven units provided with ports in communication with one another and with said pressure chamber and open to said sub-chambers when acting as compression chambers, and said last mentioned means and the driven unit provided with ports in communication with each other, with said pressure chamber and with the atmosphere exteriorly of the driven unit, when said last mentioned means is operating to move said gate valves outwardly from engagement with the bottom of said airway.

12. In a pneumatic clutch, the combination of a driving unit providing a circumferential airway open to its periphery; a driven unit providing a circumferential outer wall for said airway, having radially disposed cavities open to said airway; rotary barriers, in spaced apart relation, carried by said driving unit, disposed in said airway and cooperating with said driven unit to divide the airway into chambers; and gate valves slidably mounted in said cavities of the driven unit, movable radially into and out of engagement with the bottom of said airway, and when projected into said airway, between said barriers serving to divide said chambers into alternately changing suction and compression sub-chambers upon relative movement between the driving and driven units, said rotary barriers provided with recesses to accommodate said gate valves when there is relative movement between the driving and driven units and the rotary barriers pass said gate valve cavities, and said gate valves each having a thru port with its one opening at one side face and its other opening at one end face thereof, the last mentioned opening communicating with a port in the driven unit open to the atmosphere, when the gate valve serves to divide the driving unit chambers into said sub-chambers, and the first mentioned opening of the said ports in the gate valves all facing in the same circumferential direction, whereby air may be taken into the airway as the said barriers move away from said gate valves and the air thus taken in is subsequently compressed against the side faces of the gate valves opposite to said port openings in the gate valves.

13. In a pneumatic clutch, the combination of a driving unit providing a circumferential airway open to its periphery; a driven unit providing a circumferential outer wall for said airway and including an air pressure chamber; barriers carried by said driving unit in spaced relation, disposed in said airway and cooperating with said driven unit to divide said airway into chambers; gate valves slidable in cavities in said driven unit, movable radially into and out of engagement with the bottom of said airway, and when projected into said airway between said barriers, serving to divide said chambers into alternately changing suction and compression sub-chambers upon relative movement between the driving and driven units; valve means operative upon relative movement between said driving and driven units to permit air to flow from the compression sub-chambers to said air pressure chamber, and to cut off communication between the suction sub-chambers and said air pressure chamber whereby movement of the driving unit is imparted to the driven unit as air pressure is built up in said pressure chamber; means in said cavities to slightly overbalance the weight of said gate valves and project them against the bottom of said airway to initially overcome movement thereof due to centrifugal force as the driven unit is rotated at low speed; and second valve means to admit air from said pressure chamber to said gate valve cavities of the driven unit to overcome movement of said gate valves radially due to centrifugal force when the driven unit is operating at a high speed.

ROBERT S. PHILBRICK.